United States Patent
Brew et al.

(10) Patent No.: US 10,275,496 B2
(45) Date of Patent: Apr. 30, 2019

(54) PROCESSING EVENT LOG DATA

(71) Applicant: INTERNATIONAL BUSINESS MACHINES CORPORATION, Armonk, NY (US)

(72) Inventors: Anthony T. Brew, Dublin (IE); Jonathan I. Settle, Southampton (GB); Zhenni V N Yan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 686 days.

(21) Appl. No.: 14/964,784

(22) Filed: Dec. 10, 2015

(65) Prior Publication Data

US 2016/0179815 A1 Jun. 23, 2016

(30) Foreign Application Priority Data

Dec. 19, 2014 (GB) .................................. 1422750.8

(51) Int. Cl.
  *G06F 17/30* (2006.01)
  *G06F 11/30* (2006.01)
  *G06F 11/34* (2006.01)

(52) U.S. Cl.
  CPC .......... *G06F 17/3053* (2013.01); *G06F 11/30* (2013.01); *G06F 11/3476* (2013.01); *G06F 2201/86* (2013.01)

(58) Field of Classification Search
  CPC ............. G06F 17/3053; G06F 11/3476; G06F 2201/86

USPC ......................................................... 707/724
See application file for complete search history.

(56) References Cited

U.S. PATENT DOCUMENTS

| 7,721,152 B1 | 5/2010 | Joshi et al. |
|---|---|---|
| 8,230,259 B2 | 7/2012 | Fernandess et al. |
| 2009/0113246 A1 | 4/2009 | Sabato et al. |
| 2012/0143893 A1 | 6/2012 | Abraham |
| 2013/0185286 A1 | 7/2013 | Galitsky et al. |

OTHER PUBLICATIONS

ManageEngine, "Searching Log Data for Network Security Intelligence," downloaded from internet Dec. 2, 2015, pp. 1-5.

*Primary Examiner* — Shahid A Alam
(74) *Attorney, Agent, or Firm* — Richard Wilhelm, Esq.; Blanche E. Schiller, Esq.; Heslin Rothenberg Farley & Mesiti P.C.

(57) ABSTRACT

Processing of a set of event log data that includes event records. A search criteria is received from a user, and a subset of the set of event log data that includes event records from the set of event log data that satisfy the search criteria is determined. For each event record in the subset of event log data, a similarity score for the event record is determined, where the similarity score is indicative of the similarity of the event record to the other event records in the subset of event log data. The subset of event log data is updated by adding to each event record its similarity score, and the updated subset of event log data is then returned to the user.

20 Claims, 4 Drawing Sheets

PROCESSING EVENT LOG DATA

PRIOR FOREIGN APPLICATION

This application claims priority from United Kingdom (GB) patent application number 1422750.8, filed Dec. 19, 2014, which is hereby incorporated herein by reference in its entirety.

BACKGROUND

One or more aspects of the present invention relate to the processing of event log data.

Many services running on a computer system, such as monitoring services and user applications, will generate event records when certain important events occur. Such events may be errors that are generated, crashes or the like. The event records contain relevant details for the event, and are stored in event logs. When a user is troubleshooting a problem, it is common to search the event logs for any event records that contain information that will help determine the cause of the problem.

However, event logs often contain very large numbers of event records, which make it difficult for a user to identify any relevant event records. This is often the case even if the event records are filtered to reduce their number using appropriate search criteria, such as a keyword or time period.

SUMMARY

Shortcomings of the prior art are overcome and additional advantages are provided through the provision of a method of processing a set of event log data comprising event records. The method includes, for instance, receiving a search criteria from a user; determining a subset of the set of event log data, wherein the subset of event log data includes event records from the set of event log data that satisfy the search criteria; for each event record in the subset of event log data, determining a similarity score for the event record, wherein the similarity score is indicative of the similarity of the event record to other event records in the subset of event log data; updating the subset of event log data by adding to each event record its similarity score; returning to the user the updated subset of event log data.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the present invention will now be described, by way of example only, with reference to the following drawings in which.

DETAILED DESCRIPTION

A pattern matching framework for log analysis has been disclosed. Inputs are received via a user interface that describe a filter pattern that specifies data that is to be matched and extracted from a log, and a projection pattern that specifies how at least a portion of the data extracted using the filter pattern is to be output. A query is formed from the filter pattern and the projection pattern, and used to provide relevant data to the user.

Further, disclosed are methods for monitoring system logs by ranking the log messages and displaying the most important messages. The ranking process uses a dataset of system logs from many computer systems to score messages. For better scoring, unsupervised clustering is used to identify sets of systems that behave similarly. The expected distribution of messages in a given system is estimated using the resulting clusters, and log messages are scored using this estimation.

One or more aspects of the present invention seek to solve and/or mitigate some or all of the above-mentioned disadvantages. Alternatively and/or additionally, one or more aspects of the present invention seek to provide improved methods and systems for processing event log data.

Figure 1:
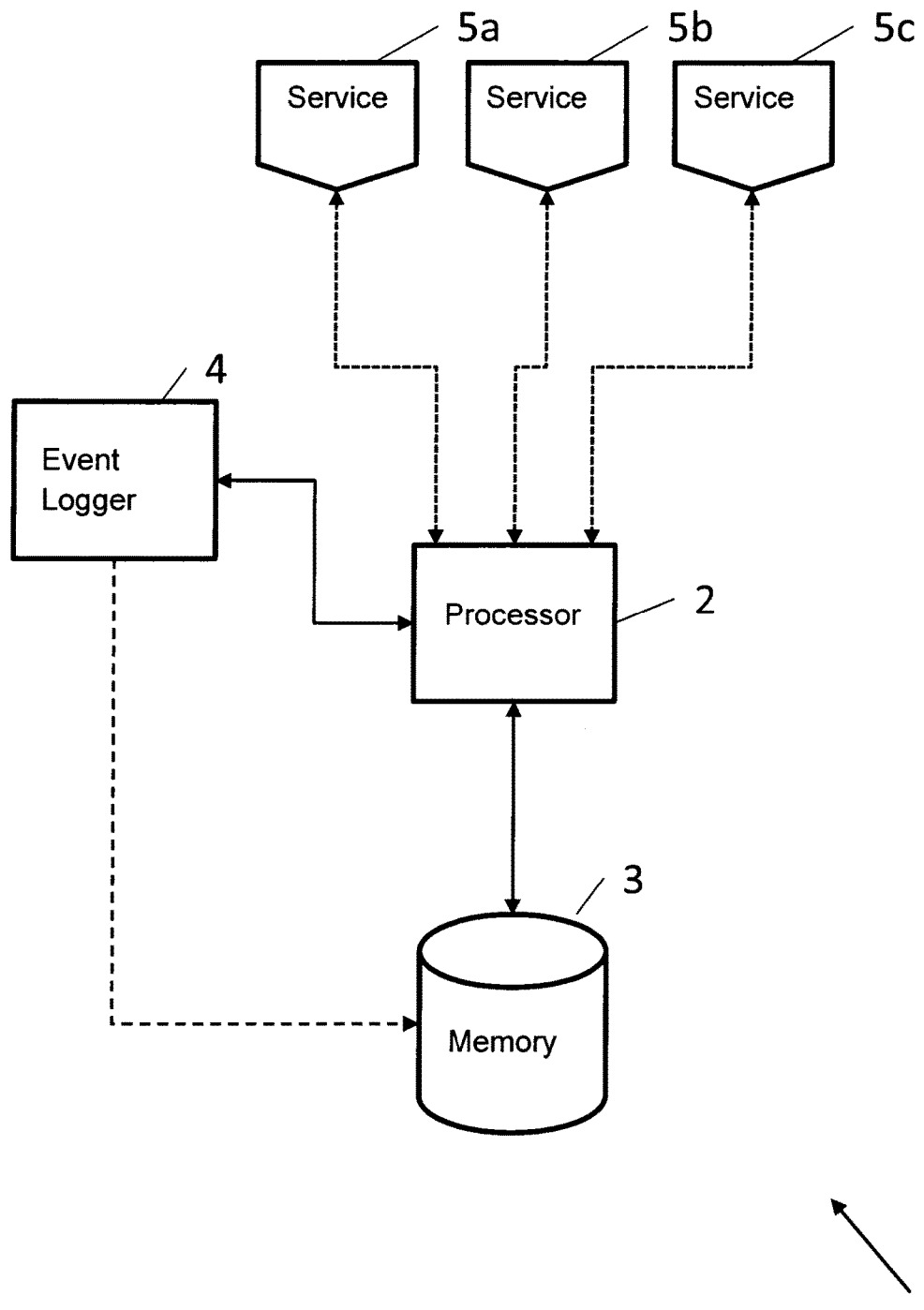
FIG. 1 shows a computer system in accordance with an embodiment of the invention.

A computer system in accordance with an embodiment of the invention is shown in FIG. 1. The computer system 1 comprises a processor 2, which is in communication with memory 3 and an event logger 4. The processor 2 is running services 5a, 5b and 5c, which may be monitoring services to monitor hardware/software systems such as hard disks, databases or the like, user applications, or any other computer system service.

The services 5a, 5b and 5c generate event records when relevant events occur, such as a system or application crashes, fails or otherwise generates an error, or the like. An event record will contain relevant details for the event, such as the system or application that experienced the event, an indication of the type of event that occurred (e.g., including an error code to identify the error that was generated), a timestamp to indicate the time the event occurred, and any other appropriate details. An event record may for example be of the form:

{"Node": "issanb384b"; "Summary": "xxxx"; "timestamp": "2014-11-02 09:10:10"} which indicates that the system/application identified by the name "issanb384b" experienced the event described by the Summary "xxxx" at 09:10:10 on 2014-11-02.

The event records are sent to the event logger 4, which stores them as event log data in the memory 3.

Figure 2:
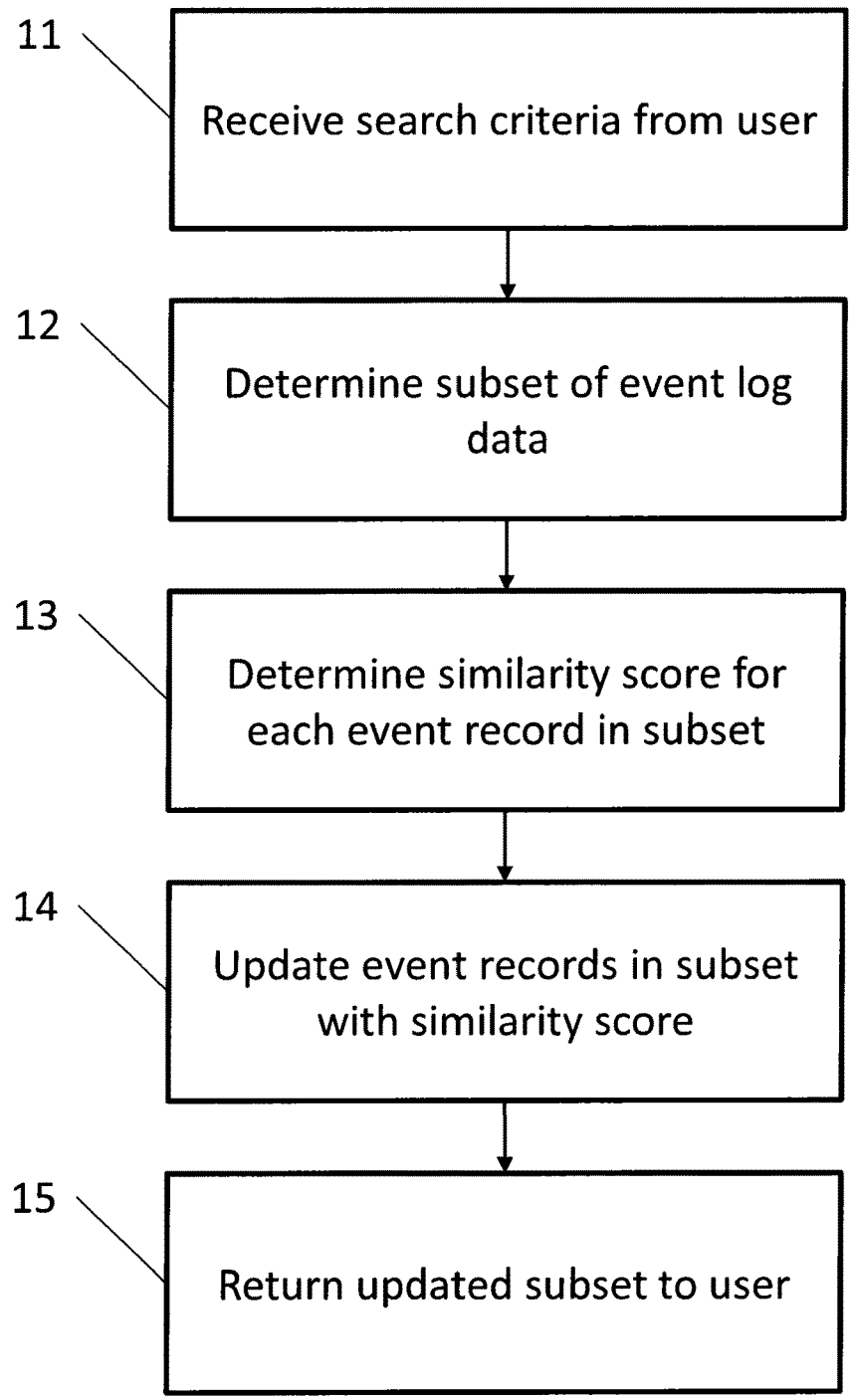
FIG. 2 is a flowchart showing one example of the operation of the computer system of FIG. 1.

The operation of the computer system 1 is now described with reference to the flowchart of FIG. 2. First, the computer system 1 receives search criteria from a user (step 11). The search criteria might, for example, search for event records that were generated by a particular system/application (e.g., that are identified by the name "issanb384b"), and/or that were generated within a particular time period (e.g., between 09:00:00 and 10:00:00 on 201411-02), and/or relate to a particular error (e.g., a permissions error), and/or any other suitable criteria. The computer system 1 then uses the search criteria to determine a subset of the event log data stored in the memory 3 (step 12); in other words, the subset of event records that satisfy the search criteria.

The computer system 1 then determines a similarity score for each event record in the subset (step 13), as described in detail below. The similarity score indicates how similar the event record is to the other event records in the subset, for example with a larger score indicating that an event record is less similar to the other event records in the subset (i.e., that it is more unusual).

The event records in the subset are then updated with their similarity scores (step 14). Supposing, for example, that the exemplary event record above received a similarity score of 7.4, the updated records would be of the form:

{"Node": "issanb384b"; "Summary": "xxxx"; "timestamp": "2014-11-02 09:10:10"; "Similarity score": "7.4"}

The updated subset is then returned to the user (step 15). In one embodiment, the updated event records are also grouped using their similarity scores. For example, event records may be grouped according to the integer part of their similarity scores; in other words, event records with a similarity score between 0 and 1 are in a first group, event records with a similarity score between 1 and 2 are in a second group, and so on. The user is then able to easily identify "unusual" event records as those with a high similarity score (indicating that they are less similar to the other event records in the subset), and can easily consider only a single representative event record from any group with a low similarity score (indicating that they are highly similar to the other event records in the subset).

Figure 3:
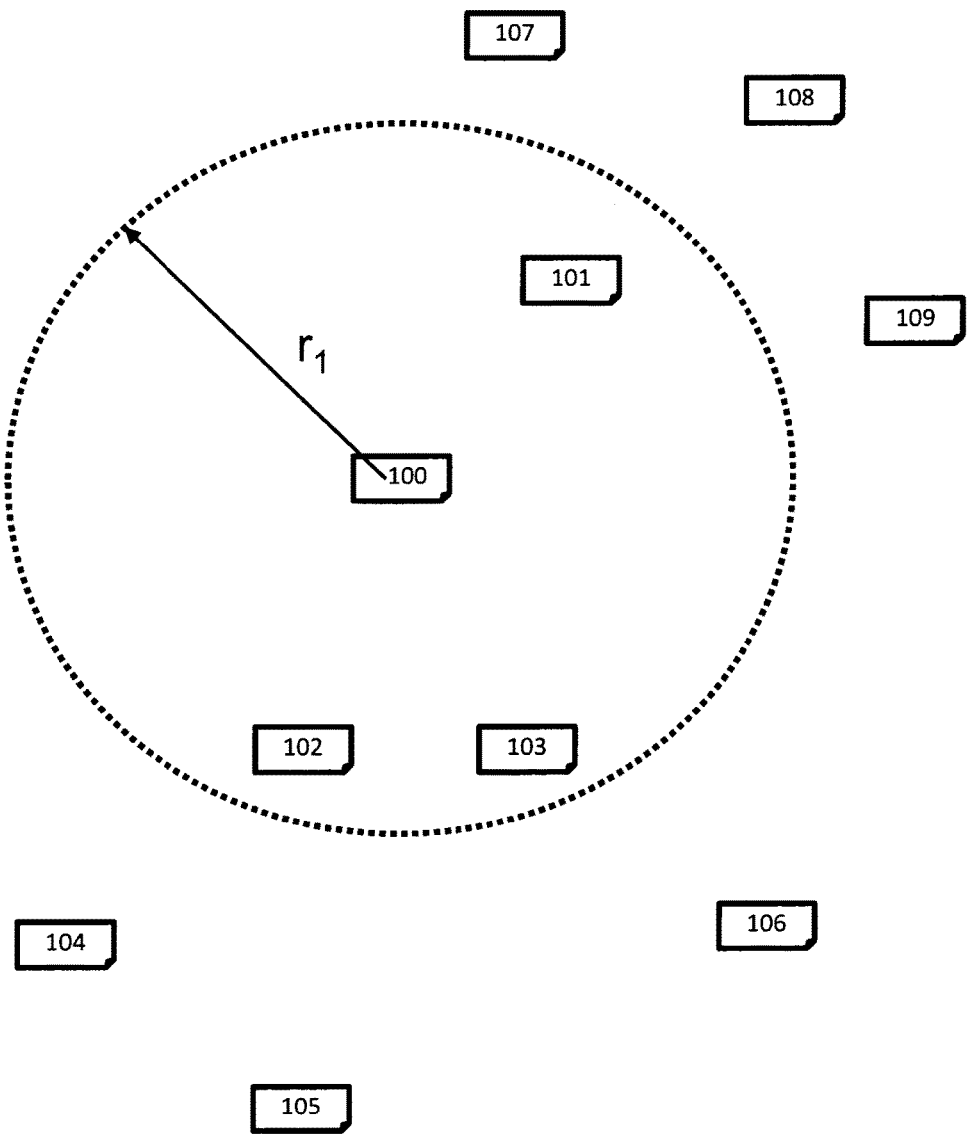
FIG. 3 is a diagram representing a method of determining the similarity score for a subset of event records, in accordance with an embodiment of the invention.

A method of determining the similarity score for a subset of event records in accordance with an embodiment of the invention is now described with reference to the diagram of FIG. 3. The diagram shows representations of event records 100 to 109, of which the similarity score for event record 100 is being determined. The positions of the other event records 101 to 109 indicate their notional distance from the event record 100. The notional distance is determined by a distance metric, as described below.

In one embodiment, the similarity score is determined using the number of event records within a predetermined notional distance $r_1$ of event record 100. The notional distance is represented by the circle of radius $r_1$, and as can be seen the event records 101, 102 and 103 are within the circle, giving a similarity score of 3. As will be appreciated, a higher similarity score indicates a larger number of "nearby" event records, indicating that an event record is more similar to other event records in the subset.

Figure 4:
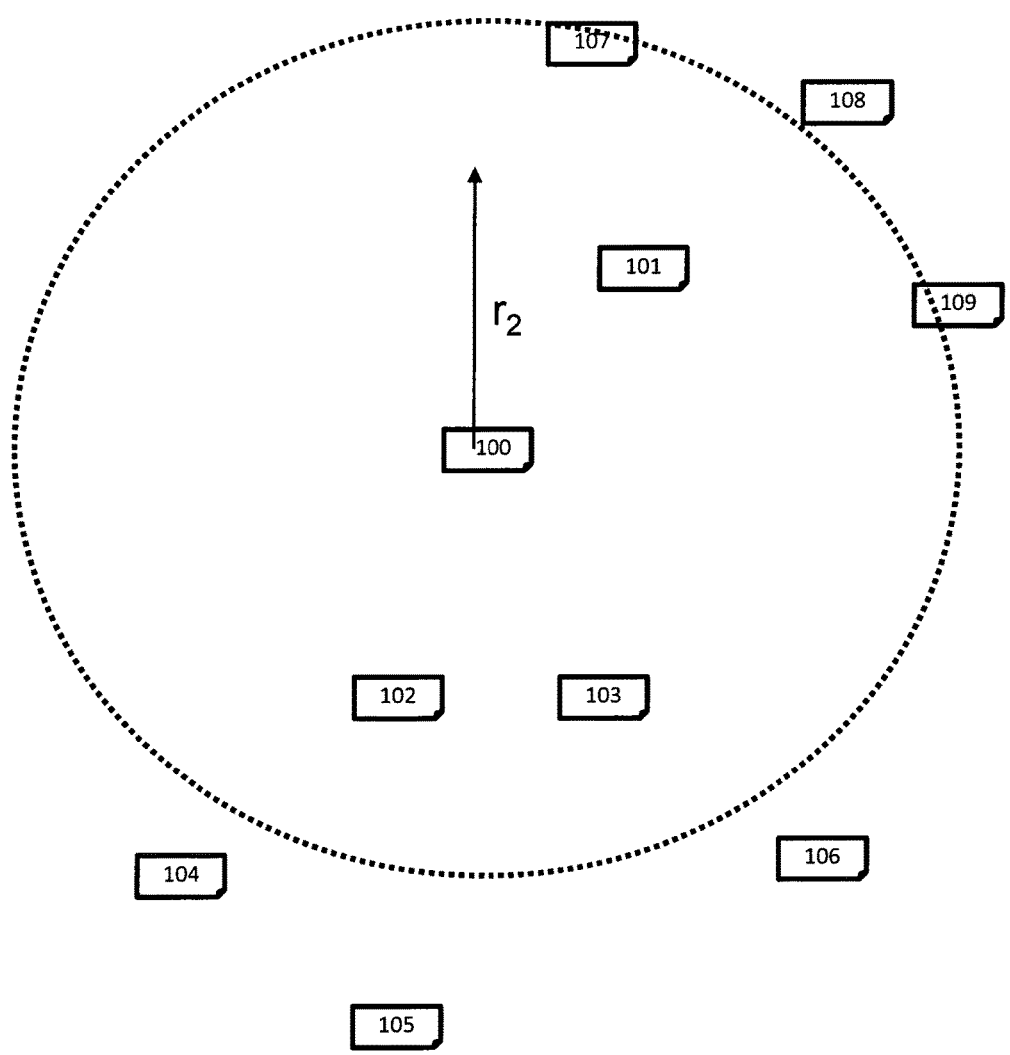
FIG. 4 is a diagram representing a method of determining the similarity score for a subset of event records, in accordance with another embodiment of the invention.

A method of determining the similarity score for a subset of event records in accordance with another embodiment of the invention is now described with reference to the diagram of FIG. 4. Again, the diagram shows representations of event records 100 to 109, and the similarity score for event record 100 is being determined.

In this embodiment, the similarity score is determined using the average notional distance to the nearest k event records to event record 100, where k is a predetermined number of event records, in this example 5 event records. As can be seen from the circle centered on event record 100, the nearest 5 event records are the event records 101, 102, 103, 107 and 109. The average notional distance to these event records is $r_2$, as indicated by the arrow in FIG. 4. As will be appreciated, in this embodiment, it is a low similarity score that indicates that an event record is more similar to other event records in the subset.

It will be appreciated that the notional distances between event records could be used in various other ways to determine suitable similarity scores. Such methods may be referred to as "nearest neighbor" methods. For example, a combination of the two described methods could be used to provide a similarity score, by adding the score given by one method to the reciprocal of the score given by the other method.

Distance metrics that are used in embodiments of the invention to determine the notional distances between event records are now described. In one example, cosine similarity could be used to provide a notional distance between two event records, based upon the text they contain. Suppose the event records $e_1$ and $e_2$ for which the notional distance is being determined are:

$e_1$: {"Node": "issanb384b"; "Summary": "Permission error"; "timestamp": "2014-11-02 09:10:10"}

$e_2$: {"Node": "issanb384b"; "Summary": "Stack overflow error"; "timestamp": "2014-11-02 11:43:57"}

Occurrences of words in each event record are then counted, ignoring word order, in this example giving the following:

| Word | Occurrences in $e_1$ | Occurrences in $e_2$ |
| --- | --- | --- |
| 09:10:10 | 1 | 0 |
| 11:43:57 | 0 | 1 |
| 2014 Nov. 2 | 1 | 1 |
| Error | 1 | 1 |
| issanb384b | 1 | 1 |
| Node | 1 | 1 |
| Overflow | 0 | 1 |
| Permission | 1 | 0 |
| Stack | 0 | 1 |
| Summary | 1 | 1 |
| Timestamp | 1 | 1 |

These values are then used to give vectors for the event records, where the value for each dimension corresponds to the count for each word:

$e_2$: (1, 0, 1, 1, 1, 1, 0, 1, 0, 1, 1)

$e_2$: (0, 1, 1, 1, 1, 1, 1, 0, 1, 1, 1)

The cosine similarity of these vectors, i.e. the cosine of the angle between them, is then determined to give the notional distance between them, in this example approximately 0.707.

In another example, the temporal proximity of the events that generated the event records could be used as the notional distance, as determined using the timestamps of the event records.

It will be appreciated that various other suitable distance metrics could be used to determine the notional distance by alternative methods that consider the same properties of the event records, and/or by considering different properties of the event records. Further, combinations of such distance metrics could be used to determine final notional distances.

In an alternative embodiment of the invention, the term frequency–inverse document frequency (tf–idf) of the raw text of the event records could be used to determine the similarity score for an event record, without a distance metric being required. The tf–idf provides a value indicating how often words appear in a piece of text (i.e., the event record), with an inverse weighting if the words are generally more common in a set of pieces of text (i.e., all the event records in the subset). The tf–idf value is larger the more times a word appears in a piece of text, but is decreased according to how often the word appears in the set of pieces of text as a whole. Thus, the tf–idf value for all the words in an event record indicates how similar the text of that event record is to the other event records in the subset. It will be appreciated that the tf-idf value could also be used in combination with other methods for determining similarity scores, for example methods that use distance metrics, to provide a final similarity score.

As described herein, in accordance with one aspect of the invention, there is provided a method of processing a set of event log data comprising event records, the method comprising: receiving a search criteria from a user; determining a subset of the set of event log data, wherein the subset of event log data consists of event records from the set of event log data that satisfy the search criteria; for each event record in the subset of event log data, determining a similarity score for the event record, wherein the similarity score is indicative of the similarity of the event record to the other event records in the subset of event log data; updating the subset of event log data by adding to each event record its similarity score; returning to the user the updated subset of event log data.

In this way, the similarity score can be used to identify event records that are not similar to other event records in the subset of event log data. This allows relevant event records to be identified more easily, as large numbers of similar event records do not need to be individually considered. In particular, by determining the similarity score using only the subset of event log data only (rather than using all of the event log data), the similarity score can provide a useful comparator for events regardless of the particular search criteria used.

The similarity score is determined, in one example, using at least one distance metric that determines a notional distance between two event records. This allows the similarity score for an event record to be determined using a notional distance between the event record and the other event records in the subset of event log data.

In the case that a distance metric is used, the notional distance between two event records may be indicative of how similar the text of one event record contains is to the text the other event record contains. This allows the similarity score for an event record to be based upon how similar that event record's text is to the text of the other event records in the subset. Alternatively and/or additionally, the notional distance between two event records is indicative of how close in time the event represented by one event record was to the event represented by the other event record. This allows the similarity score for an event record to be based upon when the event that led to the event record being generated occurred, compared with the events that generated the other event records in the subset. Each event record may comprise a timestamp, and the timestamp of one event record may be compared to the timestamp of the other event record to determine the notional distance.

It will be appreciated that there are many other suitable distance metrics that could be used to determine the similarity score, either alternatively and/or additionally to the distance metrics described above.

In the case that a distance metric is used, the similarity score for an event record may be determined based upon the number of other event records within a predetermined notional distance of the event record. This means that an event record will be considered more similar to the other event records in the subset of event log data the more other event records there are "nearby" (i.e. within the predetermined distance). Alternatively, the similarity score for an event record may be determined based upon the average notional distance to the nearest k other event records, where k is a predetermined number of event records. It will be appreciated that there are many suitable methods by which the distance metric could be used to determine the similarity score.

In one embodiment, the event records in the updated subset of event records are grouped based upon their similarity score. This allows event records that are not similar to other event records in the subset of event log data to be more easily identified.

In accordance with another aspect of the invention, there is provided a computer system comprising: a processor arranged to process one or more services; an event logger for logging event records generated by the one or more services; memory for storing a set of event log data comprising event records logged by the event logger; wherein the computer system is arranged to: receive a search criteria from a user; determine a subset of a set of event log data stored in the memory, wherein the subset of event log data consists of event records from the set of event log data that satisfy the search criteria; for each event record in the subset of event log data, determine a similarity score for the event record, wherein the similarity score is indicative of the similarity of the event record to the other event records in the subset of event log data; update the subset of event log data by adding to each event record its similarity score; return the updated subset of event log data to the user.

The similarity score is determined, for instance, using at least one distance metric that determines a notional distance between two event records. In this case, the notional distance between two event records may be indicative of how similar the text one event record contains is to the text the other event record contains. Alternatively and/or additionally, the notional distance between two event records may be indicative of how close in time the event represented by one event record was to the event represented by the other event record.

In the case that a distance metric is used, the similarity score for an event record may be determined based upon the number of other event records within a predetermined notional distance of the event record. Alternatively, the similarity score for an event record may be determined based upon the average notional distance to the nearest k other event records, where k is a predetermined number of event records.

In one embodiment, the computer system is further arranged to group the event records in the updated subset of event records based upon their similarity score.

In accordance with a further aspect of the invention, there is provided a computer program product for processing a set of event log data, the computer program product comprising a computer-readable storage medium having computer-readable program code embodied therewith, the computer-readable program code configured to perform any of the methods described above.

In accordance with yet another aspect of the invention, there is provided a computer program product for processing a set of event log data, the computer program product comprising a computer-readable storage medium having computer-readable program code embodied therewith, the computer-readable program code configured when executed on a computer system to provide any of the computer systems described above.

It will of course be appreciated that features described in relation to one aspect of the present invention may be incorporated into other aspects of the present invention. For example, the method of the invention may incorporate any of the features described with reference to the apparatus of the invention and vice versa.

While aspects of the present invention have been described and illustrated with reference to particular embodiments, it will be appreciated by those of ordinary skill in the art that aspects of the invention lend themselves to many different variations not specifically illustrated herein.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or control code written in any combination of one or more programming languages, including an control oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of facilitating processing within a computing environment, the computer-implemented method comprising:
   receiving a search criteria from a user;
   determining, by a processor, a subset of event log data of a set of event log data, the set of event log data including a plurality of event records and being generated based on one or more events that occurred within one or more computing systems of the computing environment that caused one or more errors, wherein the subset of event log data includes event records from the set of event log data that satisfy the search criteria;
   for each event record in the subset of event log data, determining, by the processor, a similarity score for the event record, wherein the similarity score is indicative of the similarity of the event record in the subset of event log data to other event records in the subset of event log data;
   updating the subset of event log data by adding to each event record its similarity score; and
   returning to the user the updated subset of event log data to be used to address the one or more events that caused the one or more errors.

2. The method as claimed in claim 1, wherein the similarity score is determined using at least one distance metric that determines a notional distance between a plurality of event records.

3. The method as claimed in claim 2, wherein the notional distance between two event records is indicative of how similar the text one event record contains is to the text the other event record contains.

4. The method as claimed in claim 2, wherein the notional distance between two event records is indicative of how close in time an event represented by one event record was to the event represented by the other event record.

5. The method as claimed in claim 2, wherein the similarity score for an event record is determined based upon the number of other event records within a predetermined notional distance of the event record.

6. The method as claimed in claim 2, wherein the similarity score for an event record is determined based upon an average notional distance to a nearest k other event records, where k is a predetermined number of event records.

7. The method as claimed in claim 1, wherein the event records in the updated subset of event log data are grouped based upon their similarity score.

8. A computer system for facilitating processing within a computing environment, the computer system comprising:
   a memory; and
   a processor in communication with the memory, wherein the computer system is configured to perform a method, said method comprising:
      receiving a search criteria from a user;
      determining, by the processor, a subset of event log data of a set of event log data, the set of event log data including a plurality of event records and being generated based on one or more events that occurred within one or more computing systems of the computing environment that caused one or more errors, wherein the subset of event log data includes event records from the set of event log data that satisfy the search criteria;
      for each event record in the subset of event log data, determining, by the processor, a similarity score for the event record, wherein the similarity score is indicative of the similarity of the event record in the subset of event log data to other event records in the subset of event log data;
      updating the subset of event log data by adding to each event record its similarity score; and
      returning to the user the updated subset of event log data to be used to address the one or more events that caused the one or more errors.

9. The computer system as claimed in claim 8, wherein the similarity score is determined using at least one distance metric that determines a notional distance between a plurality of event records.

10. The computer system as claimed in claim 9, wherein the notional distance between two event records is indicative of how similar the text one event record contains is to the text the other event record contains.

11. The computer system as claimed in claim 9, wherein the notional distance between two event records is indicative of how close in time an event represented by one event record was to the event represented by the other event record.

12. The computer system as claimed in claim 9, wherein the similarity score for an event record is determined based upon the number of other event records within a predetermined notional distance of the event record.

13. The computer system as claimed in claim 9, wherein the similarity score for an event record is determined based upon an average notional distance to a nearest k other event records, where k is a predetermined number of event records.

14. A computer program product for facilitating processing within a computing environment, the computer program product comprising:
   a computer readable storage medium readable by a processing circuit and storing instructions for execution by the processing circuit for performing a method comprising:
      receiving a search criteria from a user;
      determining, by a processor, a subset of event log data of a set of event log data, the set of event log data including a plurality of event records and being generated based on one or more events that occurred within one or more computing systems of the computing environment that caused one or more errors, wherein the subset of event log data includes event records from the set of event log data that satisfy the search criteria;
      for each event record in the subset of event log data, determining, by the processor, a similarity score for the event record, wherein the similarity score is indicative of the similarity of the event record in the subset of event log data to other event records in the subset of event log data;
      updating the subset of event log data by adding to each event record its similarity score; and
      returning to the user the updated subset of event log data to be used to address the one or more events that caused the one or more errors.

15. The computer program product as claimed in claim 14, wherein the similarity score is determined using at least one distance metric that determines a notional distance between a plurality of event records.

16. The computer program product as claimed in claim 15, wherein the notional distance between two event records is indicative of how similar the text one event record contains is to the text the other event record contains.

17. The computer program product as claimed in claim 15, wherein the notional distance between two event records is indicative of how close in time an event represented by one event record was to the event represented by the other event record.

18. The computer program product as claimed in claim 15, wherein the similarity score for an event record is determined based upon the number of other event records within a predetermined notional distance of the event record.

19. The computer program product as claimed in claim 15, wherein the similarity score for an event record is determined based upon an average notional distance to a nearest k other event records, where k is a predetermined number of event records.

20. The computer program product as claimed in claim 14, wherein the event records in the updated subset of event log data are grouped based upon their similarity score.

\* \* \* \* \*